(12) United States Patent
Springett et al.

(10) Patent No.: US 9,214,869 B2
(45) Date of Patent: Dec. 15, 2015

(54) MULTIPLE USE OF A CURRENT TRANSFORMER

(75) Inventors: Nigel Ian Springett, Emmendingen (DE); Wolfgang Bitsch, Wyhl (DE)

(73) Assignee: DET INTERNATIONAL HOLDING LIMITED, George Town Grand Cayaman (KY)

( * ) Notice: Subject to any disclaimer, the term of this patent is extended or adjusted under 35 U.S.C. 154(b) by 567 days.

(21) Appl. No.: 13/403,475

(22) Filed: Feb. 23, 2012

(65) Prior Publication Data

US 2012/0218793 A1 Aug. 30, 2012

(30) Foreign Application Priority Data

Feb. 24, 2011 (EP) .................................. 11405218

(51) Int. Cl.
*H02M 3/335* (2006.01)
*H02M 1/00* (2007.01)

(52) U.S. Cl.
CPC .. *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ....... H02M 7/21; H02M 7/217; H02M 7/219; H02M 3/335
USPC ............... 363/17, 21.06, 24, 84, 89
See application file for complete search history.

(56) References Cited

U.S. PATENT DOCUMENTS 7,796,408 B2 * 9/2010 Wang et al. ................. 363/21.06
2002/0021577 A1 2/2002 Lau
2007/0115700 A1 * 5/2007 Springett ..................... 363/24
2010/0172157 A1 7/2010 Chen et al.
2010/0327838 A1 12/2010 Melanson

FOREIGN PATENT DOCUMENTS

EP 1 783 788 A2 5/2007
WO WO 2010/020913 A1 2/2010

OTHER PUBLICATIONS

European Search Report issued in EP 11 40 5218 dated Dec. 14, 2011.

* cited by examiner

*Primary Examiner* — Adolf Berhane
*Assistant Examiner* — Yemane Mehari
(74) *Attorney, Agent, or Firm* — Birch, Stewart, Kolasch & Birch, LLP (57) ABSTRACT

A converter transformer (7) with a primary winding and a secondary winding, an integrated current transformer arranged to measure a winding current of the converter transformer, and a synchronous rectifier (11, 12) connected to the secondary winding of the converter transformer are provided. A controller is arranged to close respectively to open the synchronous rectifier depending on the measured winding current. The controller is arranged to close and/or to open the synchronous rectifier as a function of the winding current at a later and/or at an earlier time, whereby the time difference between the later and the earlier time is linearly dependent on the winding current difference, particularly to optimize a discharge process, and/or that an auxiliary supply circuit is arranged to provide auxiliary supply power, wherein the auxiliary supply circuit is arranged to derive auxiliary supply power from the integrated current transformer, in particular in overload situations.

13 Claims, 10 Drawing Sheets

MULTIPLE USE OF A CURRENT TRANSFORMER

TECHNICAL FIELD

The invention relates to a power converter comprising: a converter transformer with a primary winding and a secondary winding and an integrated current transformer arranged in order to measure a winding current of the converter transformer. The invention relates further to a method of power conversion, comprising the steps: converting electrical power with a converter transformer having a primary winding and a secondary winding and measuring a winding current of the converter transformer with an integrated current transformer.

BACKGROUND ART

In present power converters, particularly in resonant converters or switching power supplies, diode rectifiers or synchronous rectifiers are used in order to provide for a rectified output power. For high current applications, synchronous rectifiers are the preferred solution, because of their smaller power losses. A synchronous rectifier is a circuit that emulates a diode, allowing current to pass in one direction but not the other without the losses associated with diode rectifiers. In order to minimize power losses, it is very important that the synchronous rectifiers are switched at the correct times to allow current to flow in the correct direction and to avoid a short circuit across the input.

There are two broad techniques to implement the synchronous rectifier function. The first derives a sync signal from the primary controller (which often needs the crossing of a galvanic barrier), whereas the second derives the control signal independently by sensing the electrical conditions. Hence, measuring circuits have to be provided in order to measure the electric conditions like current or voltage.

It is known to use current sense resistors or current transformers in order to measure the current in a certain electrical path. Current sense resistors are cheap and often do not require much space, but cause additional losses. Current transformers are relatively accurate and do not cause additional losses, but often need considerable space.

EP 1 783 788 discloses a power converter having current sensing means. The power converter comprises a magnetic core, a primary winding and two secondary windings which are serially connected. An integrated current transformer with a ring-type core is provided, wherein end portions of the secondary windings of the power converter form primary windings of the integrated current transformer, and wherein a secondary winding is arranged on the integrated current transformer in order to sense the output current in the secondary windings of the power converter. Only one integrated current transformer is needed in order to sense the output current in both secondary windings of the power converter.

A current transformer for measuring a winding current of a power converter needs significant space, even if implemented as an integrated current transformer, and even if currents of several secondary windings are measured with the same device. Therefore, a power converter with an integrated current transformer is relatively large.

SUMMARY OF THE INVENTION

It is the object of the invention to create a power converter pertaining to the technical field initially mentioned, wherein multiple use of a current transformer is provided in order to make optimal use of the additional space required by the current transformer.

The solution of the invention is specified by the features of the independent claim(s). According to the invention a synchronous rectifier is connected to the secondary winding of the converter, wherein a controller is arranged to close and/or to open the synchronous rectifier as a function of the winding current at a later and/or at an earlier time, whereby the time difference between the later and the earlier time is linearly dependent on the winding current difference, particularly in order to optimise a discharge process, and/or an auxiliary supply circuit is arranged in order to provide auxiliary supply power, wherein the auxiliary supply circuit is arranged to derive auxiliary supply power from the integrated current transformer, in particular in overload situations.

Hence, multiple use of the integrated current transformer of a power converter is provided in order to make optimal use of the additional space required by the integrated current transformer. Accordingly, depending on the application, the integrated current transformer is used to provide for optimal switching of synchronous rectifiers and/or to provide an auxiliary power supply in overload situations. In case the integrated current converter serves as an auxiliary power supply, the power converter may comprise diodes instead of synchronous rectifiers and the current measurement may serve for monitoring purposes, for example.

Preferably, the controller is arranged to close the synchronous rectifier for a first winding current at a later time than for a second winding current, wherein the first winding current is smaller than the second winding current. This has the advantage that switching of the synchronous rectifier is load adaptive. On the other hand, switching of the synchronous rectifier occurs for the first winding current at an earlier time than for the second winding current. Hence, closing of the synchronous rectifier is adaptive to various impedances, e.g. the impedance of the load or of parasitic impedances.

In a preferred embodiment, the controller is arranged to open the synchronous rectifier for a first winding current at an earlier time than for a second winding current, wherein the first winding current is smaller than the second winding current. In particular, a variable time is provided in order to optimise discharge a FET output capacitance (FET: field effect transistor). Alternatively, the synchronous rectifier is opened for a first winding current at a later time than for a second winding current. For example, this is advantageous depending on the impedance of the load or of parasitic impedances, e.g. in case of an inductive impedance.

Preferably, the controller includes a rectifier circuit, a sensing circuit and a driver circuit, wherein the integrated current transformer is connected to the rectifier circuit and the driver circuit, wherein the sensing circuit is connected to the rectifier circuit and the driver circuit, and wherein the driver circuit is connected to the synchronous rectifier. The rectifier circuit is arranged for rectifying a voltage of the output of the integrated current transformer. The sensing circuit is arranged to sense the rectified voltage. The driver circuit is arranged to drive the synchronous rectifier, particularly by comparing the voltage of the output of the integrated current transformer with the rectified voltage. The components of the controller can be built into an integrated circuit using known technologies, which has the advantage of a simple and robust design.

In a preferred embodiment, the converter transformer includes one or more secondary windings, wherein the one or more secondary windings are connected with the integrated current transformer. Through the connection of the secondary windings with the integrated current transformer, electrical energy can be transferred from the secondary winding to the integrated current transformer. Accordingly, an auxiliary supply can be created with the integrated current transformer, wherein under normal conditions electrical energy is derived from the secondary windings of the converter transformer and wherein in short circuit supply can be derived from the integrated current transformer, which in this case serves as an alternative solution to power the synchronous rectifiers or other electronic circuits.

In a preferred embodiment, the auxiliary supply circuit comprises a diode serially connected via a connection tap to a capacitor, wherein the diode is connected to the rectifier circuit and the capacitor is connected to mass, and wherein the connection tap between the diode and the capacitor provides for the auxiliary supply. Hence, a voltage at the output of the rectifier circuit and therefore electrical energy provided by the integrated current transformer is used in order to provide an auxiliary supply, which can be provided without adding further components like a battery or any other power supply, which would need significant space. Hence, the space used by the integrated current transformer can be optimally used.

Preferably, the secondary winding is connected via a further diode to the connection tap between the diode and the capacitor. This has the advantage that the auxiliary supply is supplied by electrical power of the converter transformer and of the integrated current transformer at the same time. Hence, the electrical power is provided by the auxiliary supply in a particularly robust manner.

In another embodiment, the secondary side of the converter transformer comprises a first secondary winding and a second secondary winding, wherein the first secondary winding is serially connected via a secondary tap to the second secondary winding, and wherein the integrated current transformer is arranged to sense the winding current both in the first secondary winding and in the second secondary winding. Accordingly, multiple use of an integrated current transformer is provided also in case of multiple windings on the secondary side of the converter transformer.

Preferably, the secondary tap connecting the first secondary winding and the second secondary winding is connected via a diode in conduction direction to the connection tap between the auxiliary supply circuit, particularly to the connection tap between the diode and the capacitor. Accordingly, robustness of the auxiliary supply is also in case of multiple winding on the secondary side of the converter transformer.

According to the invention, in a method for power conversion, closing and/or opening the synchronous rectifier occurs as a function of the winding current at a later and/or at an earlier time, whereby the time difference between the later and the earlier time is linearly dependent on the winding current difference, particularly in order to optimise a discharge process, and/or providing auxiliary supply power occurs which is derived from the integrated current transformer, in particular in overload situations.

Hence, multiple use of the integrated current transformer of a power converter is provided in order to make optimal use of the additional space required by the integrated current transformer. Hence, depending on the application, the integrated current transformer is used to provide for optimal switching of synchronous rectifiers and/or to provide an auxiliary power supply in overload situations.

Preferably, the synchronous rectifier is closed for a first winding current at a later time than for a second winding current, wherein the first winding current is smaller than the second winding current. Alternatively, the synchronous rectifier is closed for the first winding current at an earlier time than for the second winding current. This has the advantage that closing of the synchronous rectifier can be adapted to various loads and/or parasitic effects, like inductive and/or capacitive loads and/or parasitic effects.

In a preferred embodiment, the synchronous rectifier is opened for a first winding current at an earlier time than for a second winding current, wherein the first winding current is smaller than the second winding current. Alternatively, the synchronous rectifier is opened for the first winding current at a later time than for the second winding current. This has also the advantage of the possibility of adaption to various capacitive and/or inductive loads and/or parasitic effects.

Preferably, producing an auxiliary supply power is provided by arranging an auxiliary supply circuit to derive auxiliary supply power from the integrated current transformer, wherein the auxiliary supply circuit comprises a diode serially connected via a connection tap to a capacitor, wherein the diode is connected to the rectifier circuit and the capacitor is connected to mass, and wherein the connection tap between the diode and the capacitor provides for the auxiliary supply. This has the advantage that the space used by the integrated current transformer can be used in an additional manner and no further space for arranging a battery or another power supply has to be used up.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
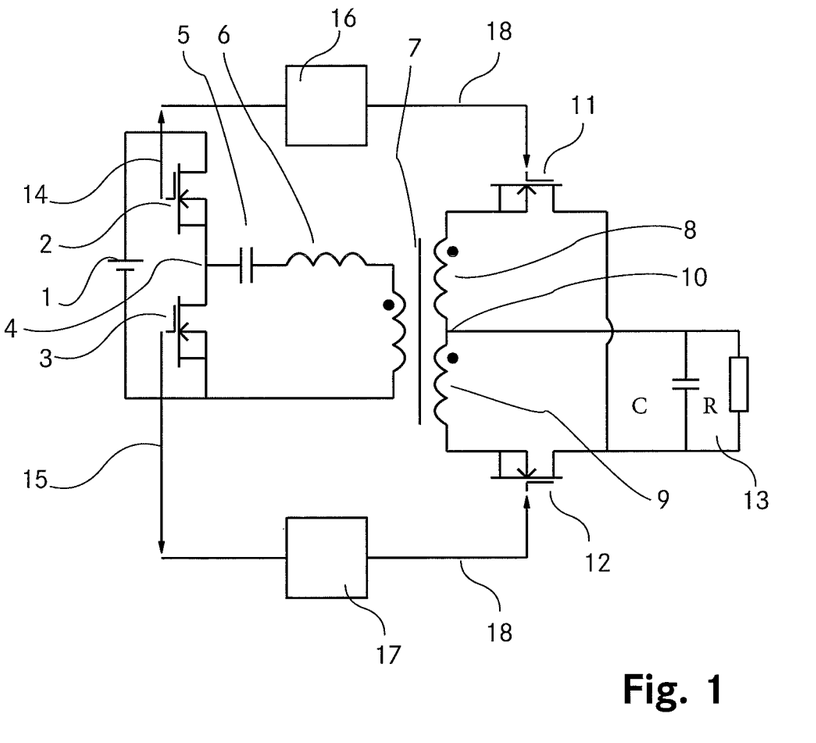
FIG. 1 a resonant converter according to the state of the art.

FIG. 1 shows a resonant converter according to the state of the art. A DC power source 1 (DC: direct current) is connected to a first switch 2 and a second switch 3, which are serially connected through primary tap 4. The first switch 2 and the second switch 3 are alternately opened and closed, whereby at primary tap 4 an oscillating voltage is generated. Primary tap 4 is connected through a capacitor 5 and an inductor 6 to the primary winding of converter transformer 7, which is also connected to one end of the DC power source 1. On the secondary side of converter transformer 7, a first secondary winding 8 and a second secondary winding 9 are serially connected through secondary tap 10. A first synchronous rectifier 11 is connected to the first secondary winding 8 and a second synchronous rectifier 12 is connected to the second secondary winding 9. The secondary tap 10 is connected to one end of load 13, whereas the other end of load 13 is connected to the first synchronous rectifier 11 and the second synchronous rectifier 12.

The load 13 may include resistive, capacitive and/or inductive components. As an example, in FIG. 1 a load having resistive and capacitive components R and C is shown. Capacitive components may serve smoothing the output voltage.

Synchronous rectifiers and switches may include a MOSFET transistor (MOSFET: metal oxide semiconductor field effect transistor), a bipolar transistor or any other semiconductor switch. A synchronous rectifier or a switch is driven in such a way that a rectifying function is performed or that an oscillating voltage is generated.

The first switch 2 and the second switch 3 are controlled by a controller (not shown). As depicted by arrows 14, 15, the control signals of the first switch 2 and of the second switch 3 are forming an input signal to rectifier controllers 16, 17, which generate control signals 18, 19 for the first synchronous rectifier 11 and for the second synchronous rectifier 12. Particularly, the rectifier controllers 16, 17 may include synchronous detector circuits, constant pulse width generators, gates and reference voltage sources.

It is well known in the state of the art to build a resonant converter according to FIG. 1. However, designing such a resonant converter has several disadvantages. Among others, timing is critical, no protection for parallel operation is provided and the circuit is not load adaptive.

Figure 2:
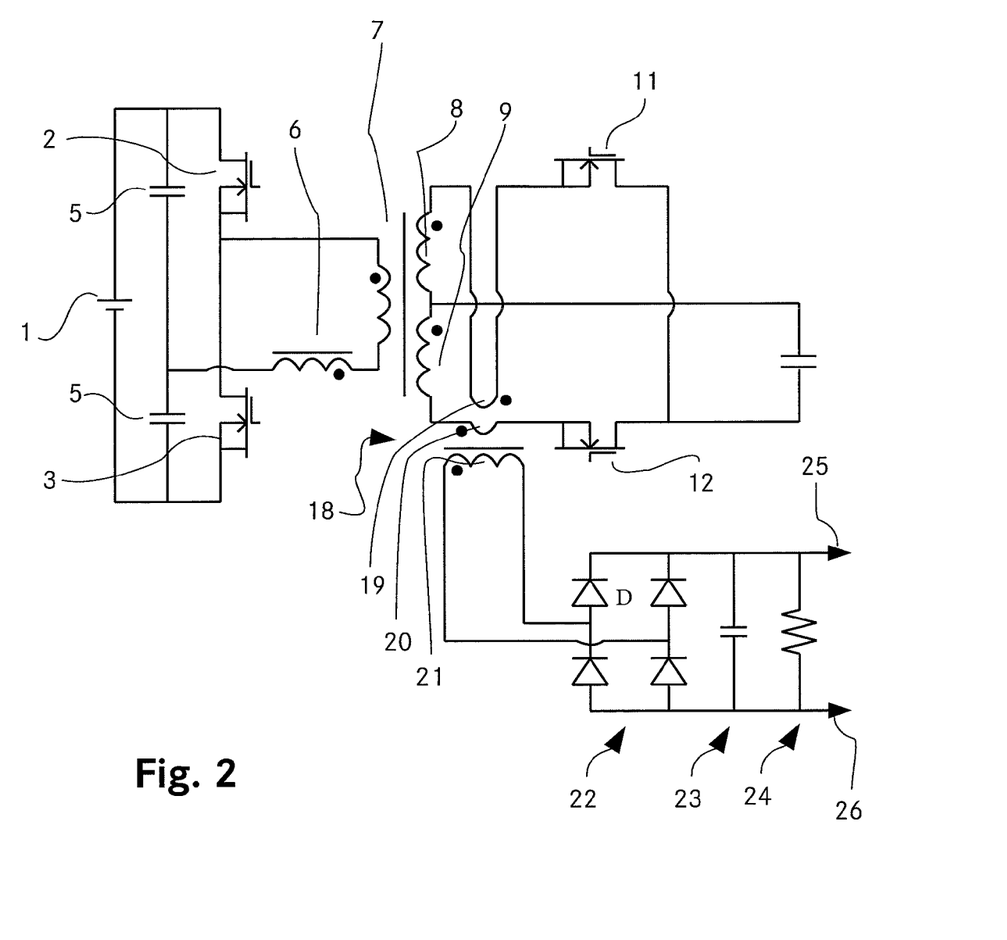
FIG. 2 a resonant converter including an integrated current transformer.

FIG. 2 shows a resonant converter which includes an integrated current transformer 18, as described, for example, in EP 1 783 788. The first secondary winding 8 and the second secondary winding 9 are connected to a first primary winding 19 and to a second primary winding 20 of the integrated current transformer 18. Alternatively, the first primary winding 19 and the second primary winding 20 may be directly formed by one or more sections or windings of the first secondary winding 8 and the second secondary winding 9. Accordingly, the current flowing in the first primary winding 19 of the integrated current transformer 18 equals the current flowing in the first secondary winding 8 of the converter transformer 7 respectively the current flowing in the second primary winding 20 of the integrated current transformer 18 equals the current flowing in the second secondary winding 9 of the converter transformer 7.

The integrated current transformer 18 includes a secondary winding 21. Thus, currents flowing in the first secondary winding 8 or in the second secondary winding 9 induce currents in the secondary winding 21 of the integrated current transformer 18. As shown in FIG. 2, a rectifier circuit 22 comprising rectifier diodes D is connected to the secondary winding 21, as well as a measuring capacitor 23 and a current sense resistor 24. A voltage 28 proportional to the currents in the first secondary winding 8 respectively proportional to the current in the second secondary winding 9 is generated on measuring taps 25, 26 connected to the current sense resistor 24.

Figure 3:
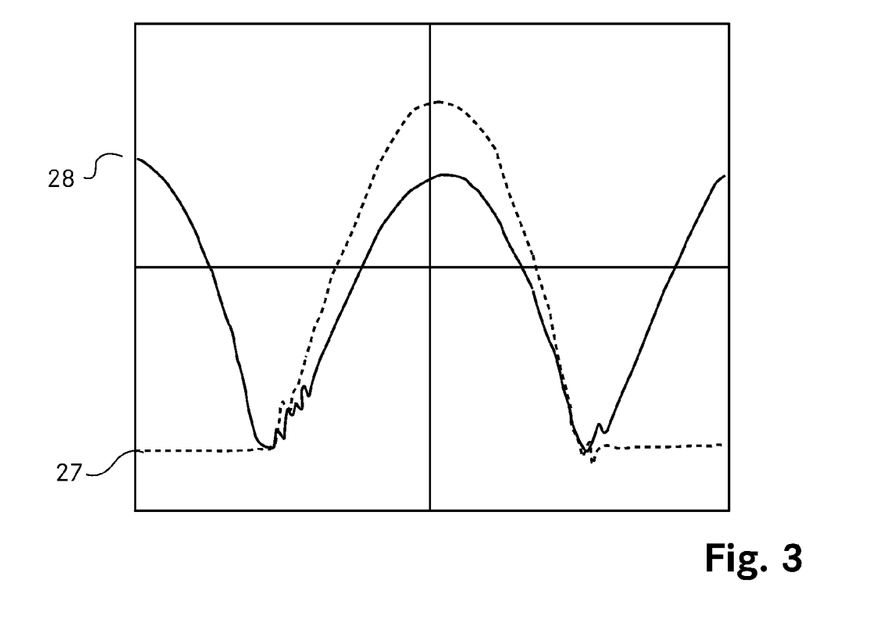
FIG. 3 the relation between current waveforms at a synchronous rectifier and voltage measured by an integrated current transformer.

FIG. 3 depicts the current waveforms of the current 27 measured at the first synchronous rectifier 11 and the voltage 28 measured at the measuring taps 25, 26 as described above. In order to control operation of the first synchronous rectifier 11 and the second synchronous rectifier 12, measurement of the respective currents is necessary, which can be performed with the integrated current transformer 18 as described. A good correlation between the actual current and the measured current is achieved. However, through filtering effects of the measurement circuit comprising the integrated current transformer 18, the rectifier circuit 22, the measuring capacitor 23 and the current sense resistor 24, a phase shift between the current 27 in the windings and the voltage 28 at measuring taps 25, 26 is caused.

Figure 4:
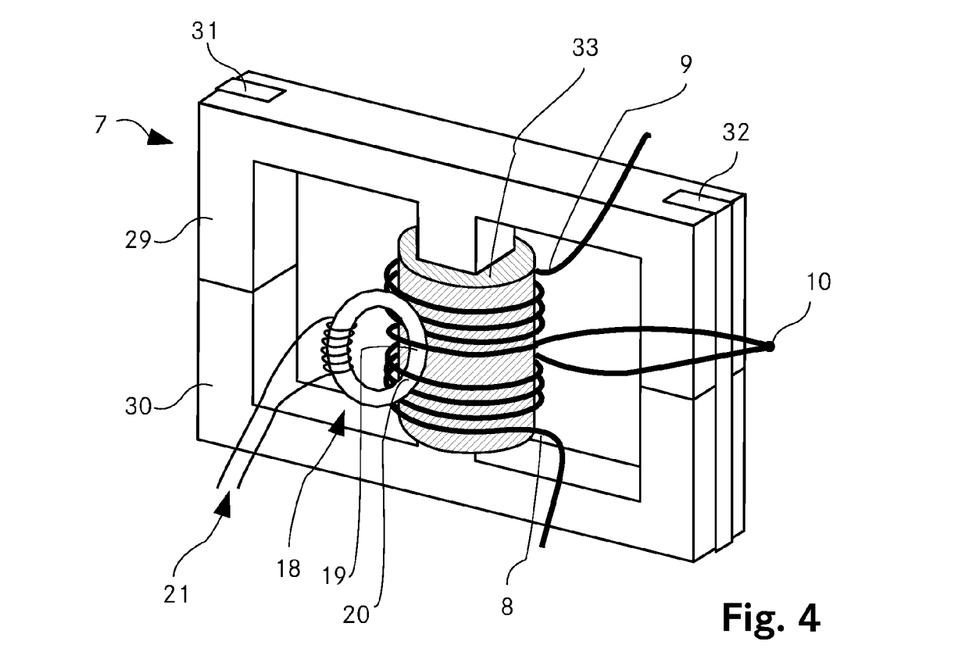
FIG. 4 a schematic, perspective view of a converter transformer with an integrated current transformer.

FIG. 4 shows a schematic, perspective view of an embodiment of converter transformer 7. The core of converter transformer 7 comprises a first E-type core 29 and a second E-type core 30, which are abutting each other as shown in FIG. 4 to form a path for magnetic flux. For example, first E-type core 29 and second E-type core 30 are firmly attached to each other using clamps 31, 32. On the middle legs of the first E-type core 29 and second E-type core 30, a bobbin 33 is arranged. Onto bobbin 33, the first secondary winding 8 and the second secondary winding 9 are wound, which are connected to each other at secondary tap 10.

In FIG. 4, the primary winding of converter transformer 7 is not shown. For example, the primary winding may be arranged on one of the pair of legs of the first E-type core 29 and the second E-type core 30.

An integrated current transformer 18 is arranged to converter transformer 7 as shown in FIG. 4. The integrated current transformer 18 has a core 34, wherein a portion of the first secondary winding 8 and a portion of the second secondary winding 9 form the first primary winding 19 and the second primary winding 20 of the integrated current transformer 18. The secondary winding 21 is wound on the core 34 of the integrated current transformer 18. Thus, currents of the first secondary winding 8 and/or of the second secondary winding 8 induce currents in the secondary winding 21 of the integrated current transformer 18.

Figure 5:
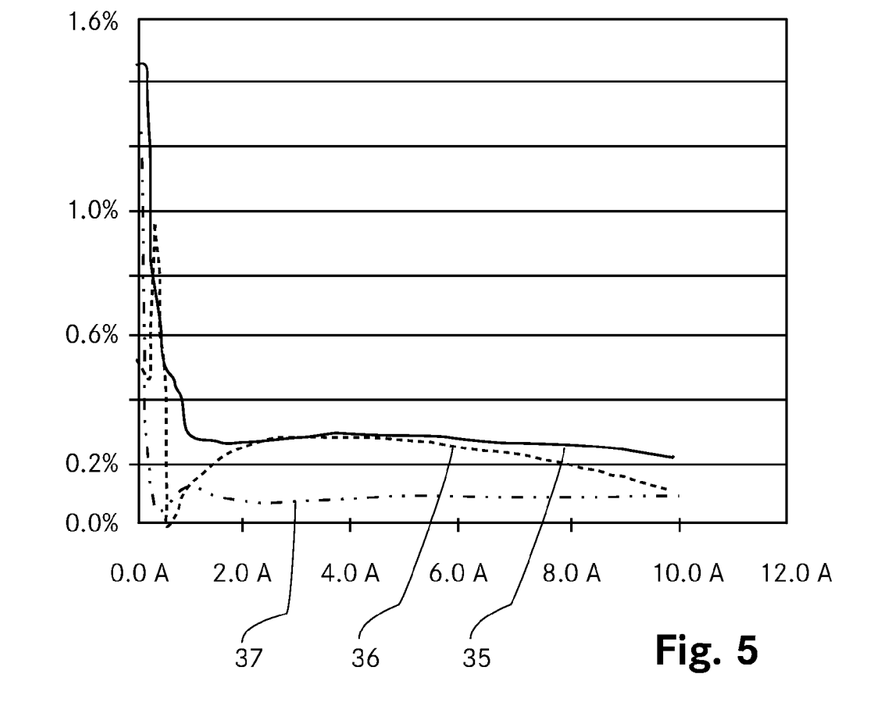
FIG. 5 the reading error for various winding ratios of the integrated current transformer.

FIG. 5 shows schematically the reading error as a function of the output current of the resonant converter for various winding ratios of the integrated current transformer. As an example, in FIG. 5 a first graph 35, a second graph 36 and a third graph 37 are shown. First graph 35 may relate to a winding ratio of 50:1, second graph 36 may relate to a winding ratio of 100:1 and third graph 36 may relate to a winding ratio of 200:1.

As can be seen from the graphs, the error depends on the output current. For small currents below say 1-2 A, the reading error may be as high as 1.6%, whereas for large currents above say 4-8 A, the reading error may be as low as 0.1%. It has to be pointed out that FIG. 5 is only an example to illustrate the qualitative behaviour of the reading error. In actual embodiments, the values may depart from the indicated values.

For a winding ratio of for example 50:1, which relates to the first graph 35, the reading error oscillates for small output currents of say 1-2 A between 1.0% and 0.0%. For output currents of about 2-6 A, the reading error is about 0.2-0.3% and for output currents above 8 A the reading error slowly goes below 0.2-0.1%.

For a winding ratio of for example 100:1, which relates to the second graph 36, the reading error is about 1.6% for an output current of say below 0.5 A. For an output current of 1 A, the reading error falls to about 0.3-0.6%. For output currents of above 1 A, the reading error remains essentially around 0.3%.

For a winding ratio of for example 100:1, which relates to the second graph 37, the reading error is about 1.2% for an output current of say below 0.2 A. For an output current of 0.2 A-2 A, the reading error oscillates between about 0.05%-0.15%. For an output current of above 2 A, the reading error is about 0.1%.

The main source of errors is the current sense resistor 24 (cf. FIG. 2), which may have a tolerance of for example 1%.

At low output current, the main cause of the reading error is output capacitance of diodes/snubber. No error is caused by magnetizing current or losses in the core of the integrated current transformer 18.

Figure 6A:
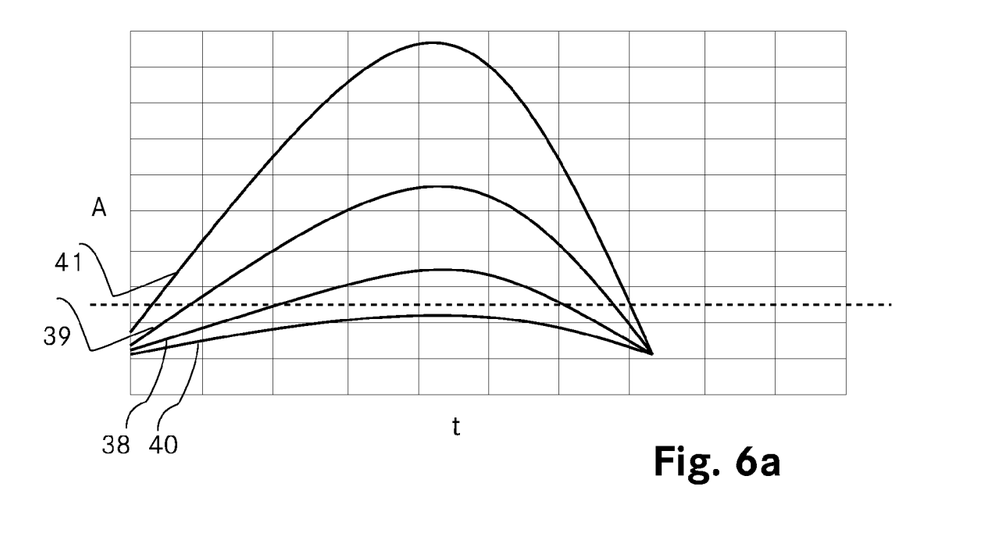
FIG. 6a-FIG. 6c the winding current in a synchronous rectifier and control strategies of the synchronous rectifier.
Figure 6B:
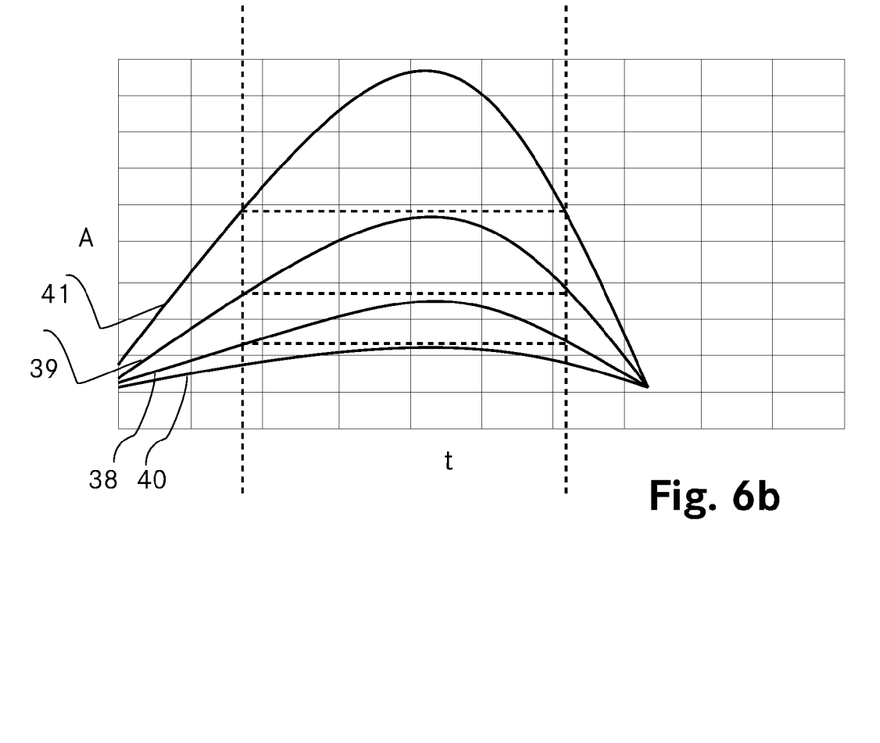
Figure 6C:
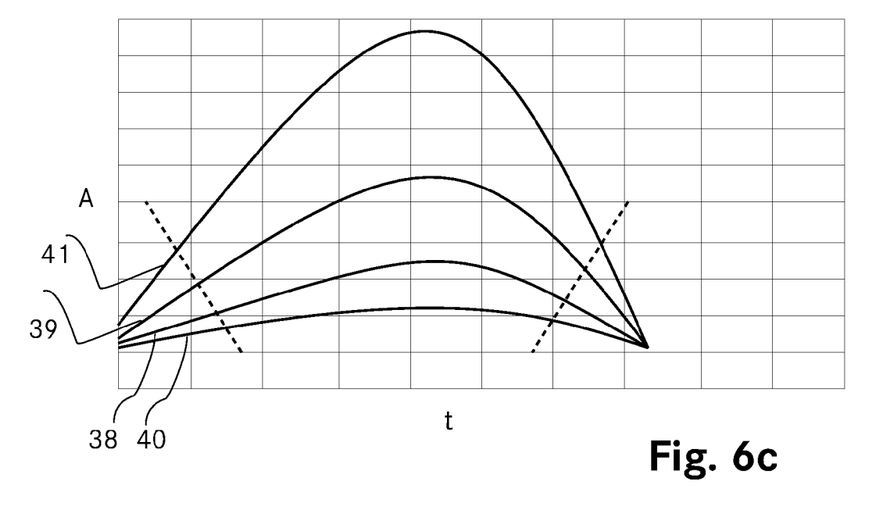

FIG. 6a-FIG. 6c show schematically the amplitude of a winding current in a synchronous rectifier. The oscillating voltage on the primary side of converter transformer 7 is transformed into an oscillating voltage on the secondary side. With the synchronous rectifiers, which are closed and opened in accordance to the oscillating voltage, the voltage is rectified, whereby a winding current of a certain magnitude flows through the synchronous rectifiers as shown in FIG. 6a-FIG. 6c. The magnitude of the winding current depends on the load attached to the power converter. In FIG. 6a-FIG. 6c a first winding current 38, a second winding current 39, a third winding current 40 and a fourth winding current 41 are depicted.

It is important that the synchronous rectifier is not closed too early and not opened too late. It is known to turn on the synchronous rectifier when the winding current is above a fixed threshold and to open the synchronous rectifier when the winding current is below that threshold (cf. FIG. 6a). However, such a control strategy of the synchronous rectifier has the disadvantage that for small winding currents the synchronous rectifier is not turned on at all and that for large winding currents the synchronous rectifier may be turned off too late.

In another control strategy, the threshold depends on the winding current, for example, the threshold is 10% of the maximum winding output current (cf. FIG. 6b). With such a control strategy, the synchronous rectifier is turned on for any winding current, i.e. for small winding currents as well as for large winding currents. Moreover, this control strategy gives a relatively fixed time, which means that the synchronous rectifier is turned on for a specific time period irrespective of the winding current. Such a control strategy is not optimal at low load, where more time is needed to discharge the capacitance of the synchronous rectifier.

According to the invention, a first winding current 38 is smaller than a second winding current 39. For the first winding current 38, the synchronous rectifier is closed at a later time than for the second winding current 39 (cf. FIG. 6c). On the other hand, the synchronous rectifier is opened earlier for the first winding current 38 than for the second winding current 39. Hence, the time period is variable and allows optimization of the discharge of the capacitance of the synchronous rectifier. Moreover, noise immunity is increased and an optimal switching is achieved.

Figure 7:
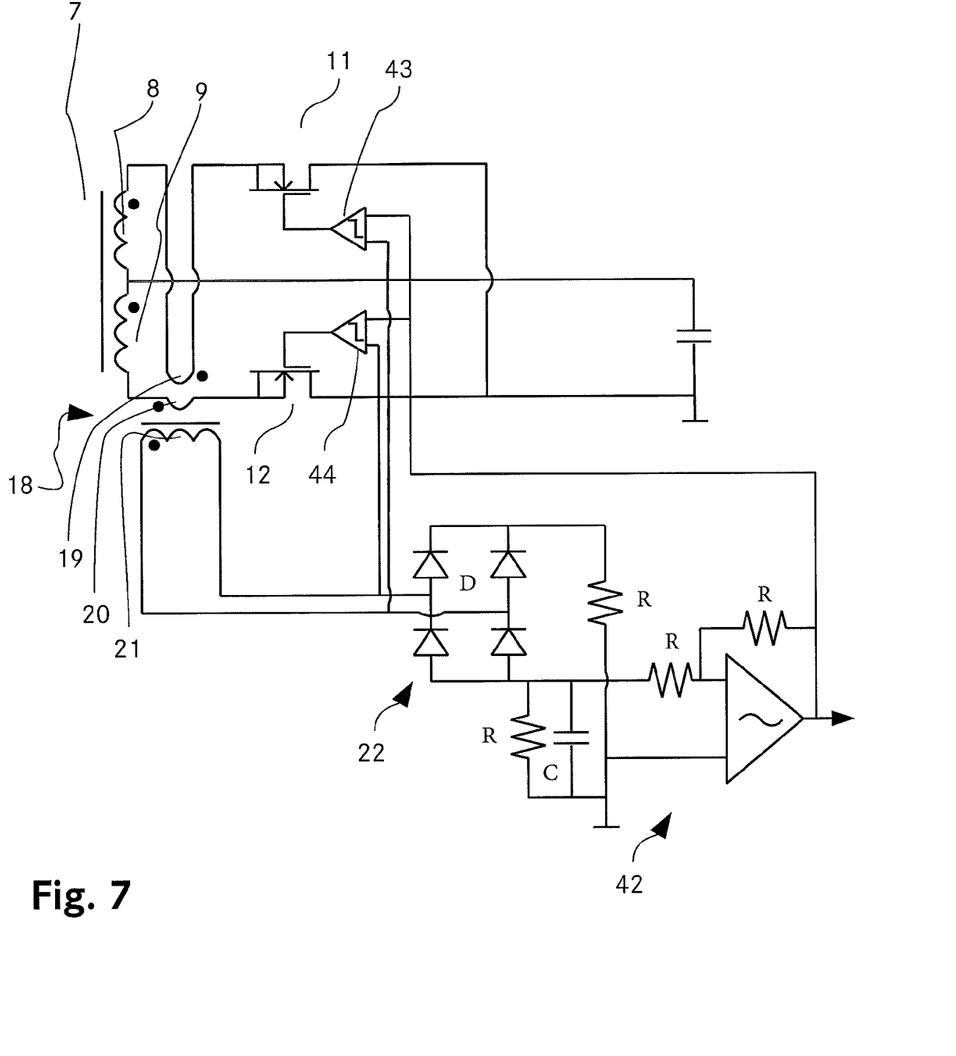
FIG. 7 the secondary side of a power converter according to the invention.

FIG. 7 shows schematically the secondary side of a power converter according to the invention. The integrated current transformer 18 is connected to the rectifier circuit 22. At the output of the rectifier circuit 22 having rectifier diodes D, a sensing circuit 42 having resistors R and capacitors C is connected, in order to sense a winding current. The input of the rectifier circuit 22 and the output of the sensing circuit 42 are connected to comparators 43, 44 which are designed to close and to open the synchronous rectifiers 11, 12. The circuit as shown in FIG. 7 is designed to close and to open the synchronous rectifiers such that for a first winding current 38, which is smaller than a second winding current 39, the synchronous rectifier is closed at a later time than for the second winding current 39 and opened at an earlier time than for the second winding current 39.

In many applications, a continuous current is required and short circuit hick-up mode with pulsating output is not allowed. Under normal conditions, auxiliary supply can be derived from the converter transformer secondary side or from the output of the converter. In short circuit, auxiliary supply cannot be derived from the converter transformer secondary or converter output and no power is available for the synchronous rectifiers.

Figure 8:
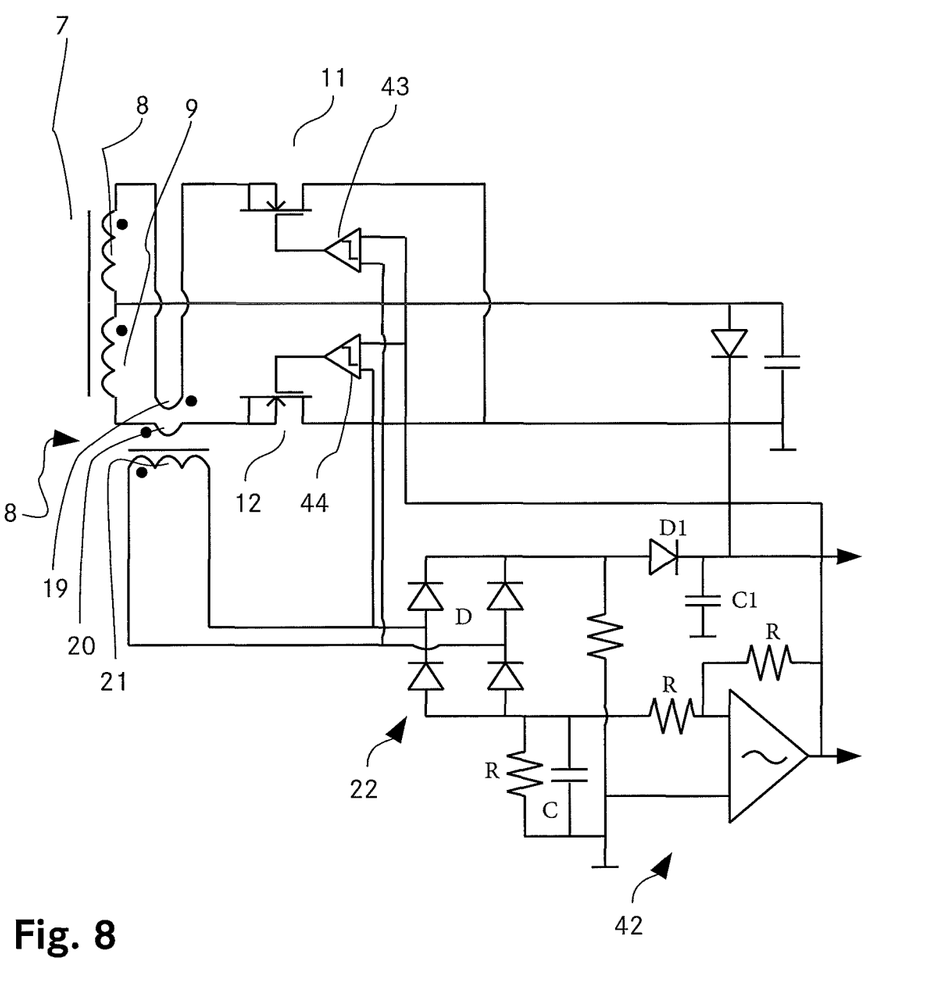
FIG. 8 the secondary side of a power converter according to the invention including an auxiliary supply.

FIG. 8 shows schematically the secondary side of a power converter according to the invention. The integrated current transformer 18 is connected to the rectifier circuit 22. A diode D1 is connected to the output of the rectifier circuit 22. In conduction direction of the diode D1, a capacitor C1 is serially connected to the diode and further to mass, wherein a connection tap between the diode and the capacitor provides for the auxiliary supply. Accordingly, the integrated current transformer 18 is used to provide auxiliary power, which justifies the additional space used by the integrated current transformer.

As shown in FIG. 8, a further diode may be connected in conduction direction from the secondary tap to the connection tap.

Figure 9A:
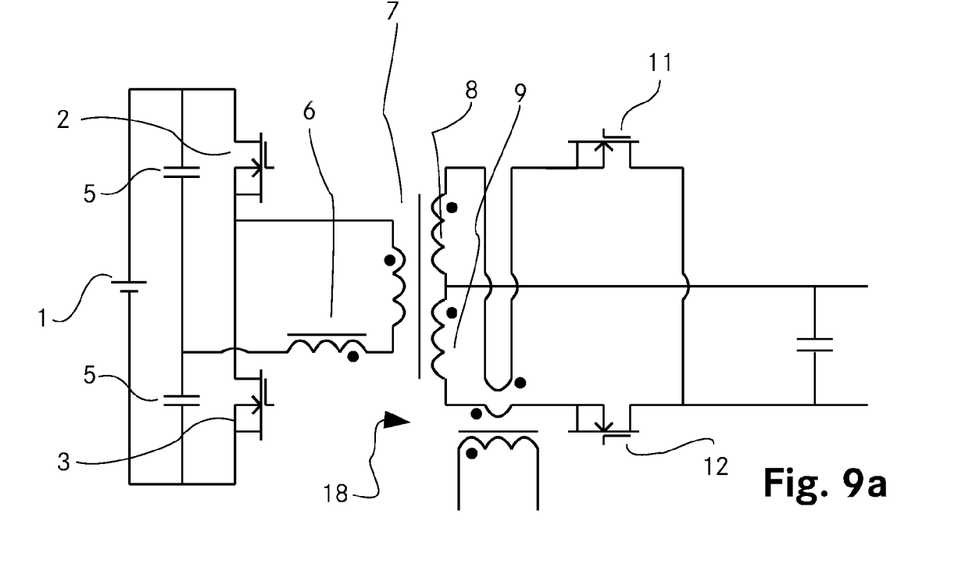
FIG. 9a-9f embodiments of resonant converters including an integrated current transformer.
Figure 9B:
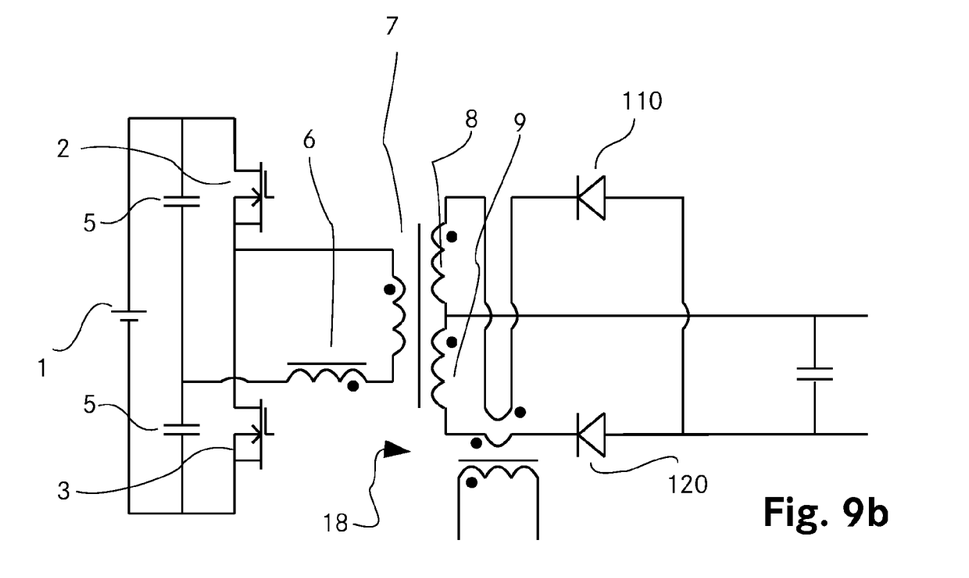

FIG. 9a shows schematically a resonant converter with halfbridge primary side and centre tap secondary side synchronous rectifier circuits. FIG. 9b shows schematically a resonant converter with halfbridge primary side and centre tap secondary side diodes 110, 120.

Figure 9C:
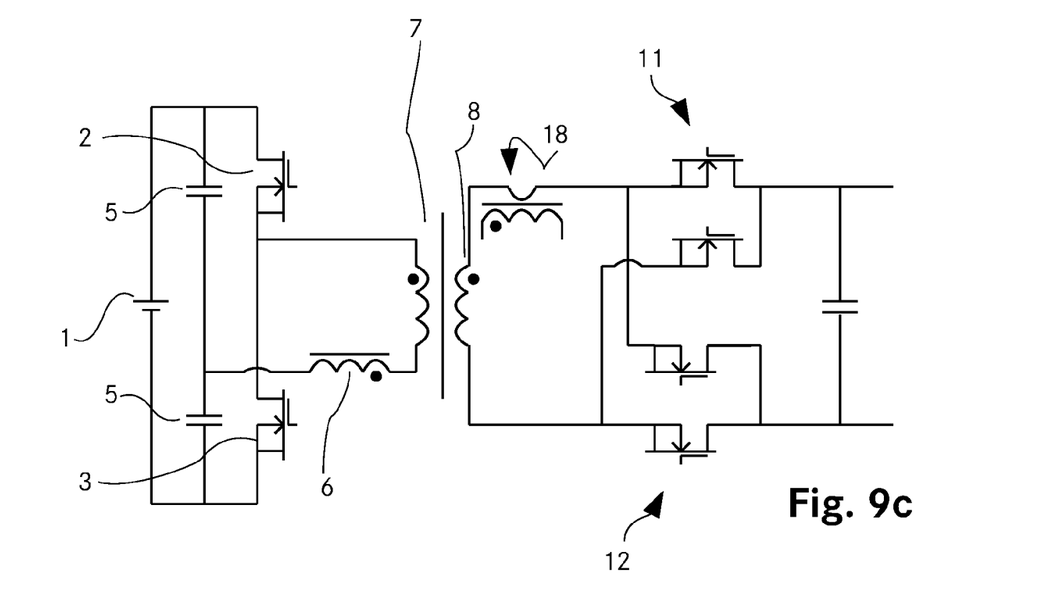
Figure 9D:
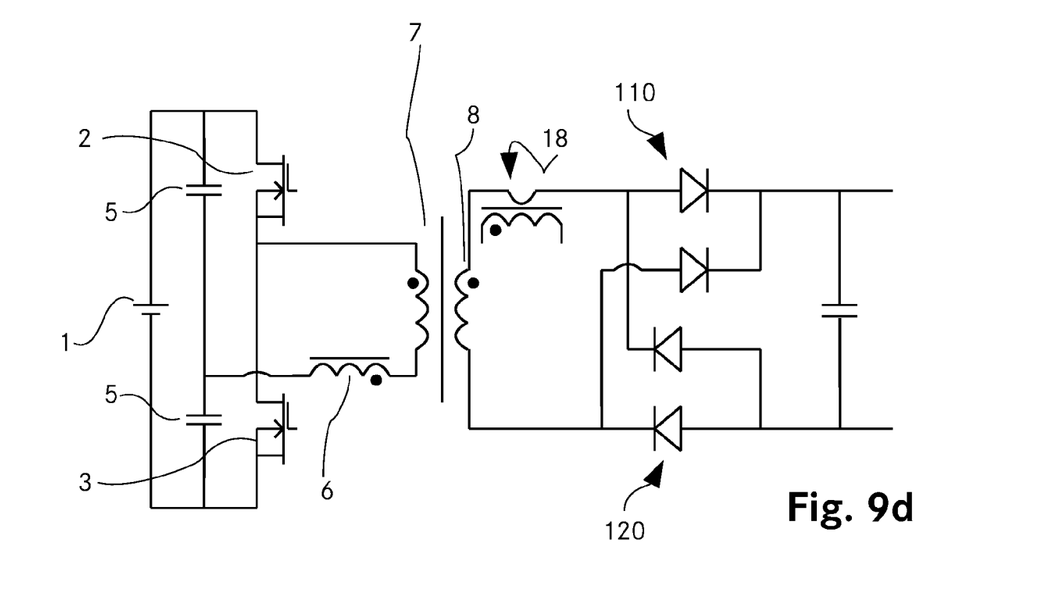

FIG. 9c shows schematically a resonant converter with halfbridge primary side and a bridge with synchronous rectifiers on the secondary side. FIG. 9d shows schematically a resonant converter with halfbridge primary side and a bridge with diodes 110, 120 on the secondary side.

Figure 9E:
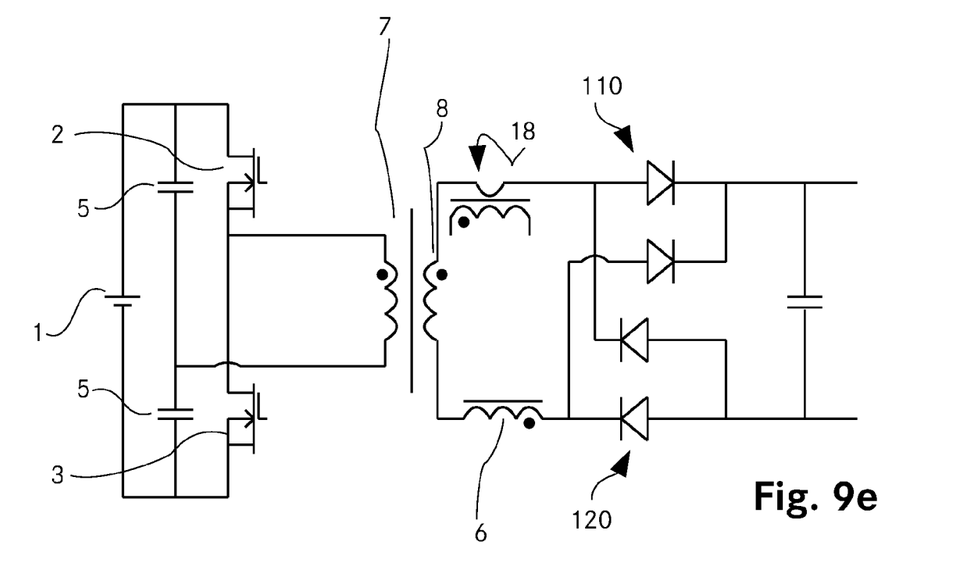
Figure 9F:
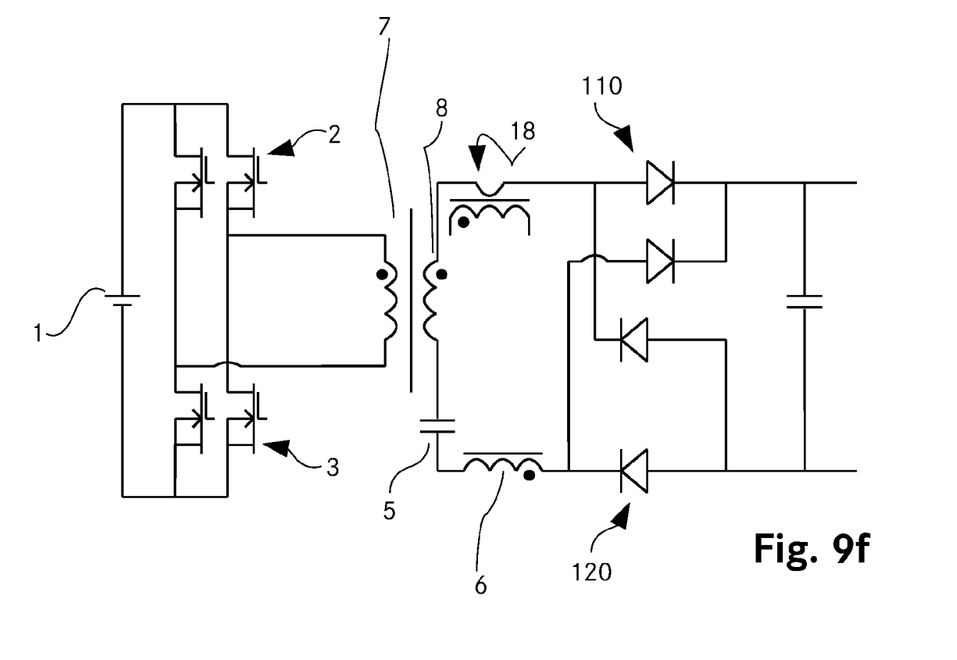

FIG. 9e shows schematically a full bridge resonant converter with a resonant inductor on the secondary side and capacitors on the primary side. FIG. 9f shows schematically a full bridge resonant converter with a resonant inductor and capacitor on the secondary side.

Depending on the application, the integrated current transformers of the converters according to the embodiments of FIG. 9a-9f are designed to measure a current in the secondary side of the resonant converter, which measurement serves for the control of the synchronous rectifiers or for monitoring purposes, for example. Moreover, an integrated current transformer may serve as an auxiliary power supply, particularly in overload condition.

In summary, it is to be noted that multiple usage of a current transformer has been described, such that space used by the current transformer can be used for multiple purposes.

The invention claimed is:

1. A power converter comprising: a) a converter transformer with a primary winding and a secondary winding;
   b) an integrated current transformer arranged in order to measure a winding current of the converter transformer; wherein:
   c) a synchronous rectifier is connected to the secondary winding of the converter transformer, wherein a controller is arranged to close and/or to open the synchronous rectifier as a function of the winding current at a later and/or at an earlier time, whereby the time difference between the later and the earlier time is linearly dependent on the winding current difference, and
   d) an auxiliary supply circuit is arranged in order to provide auxiliary supply power,
   wherein the auxiliary supply circuit is arranged to derive auxiliary supply power from the integrated current transformer, in particular in overload situations.

2. The power converter according to claim 1, wherein the controller is arranged to close the synchronous rectifier for a first winding current at a later time than for a second winding current, and wherein the first winding current is smaller than the second winding current.

3. The power converter according to claim 1, wherein the controller is arranged to open the synchronous rectifier for a first winding current at an earlier time than for a second winding current, and wherein the first winding current is smaller than the second winding current.

4. The power converter according to claim 1, wherein the controller includes a rectifier circuit, a sensing circuit and a driver circuit, wherein the integrated current transformer is connected to the rectifier circuit and the driver circuit, wherein the sensing circuit is connected to the rectifier circuit and the driver circuit, and wherein the driver circuit is connected to the synchronous rectifier.

5. The power converter according to claim 4, wherein the auxiliary supply circuit comprises a diode serially connected via a connection tap to a capacitor, wherein the diode is connected to the rectifier circuit and the capacitor is connected to mass, and wherein the connection tap between the diode and the capacitor provides for the auxiliary supply.

6. The power converter according to claim 5, wherein the secondary winding is connected via a further diode to the connection tap between the diode and the capacitor.

7. The power converter according to claim 1, wherein the converter transformer includes one or more secondary windings, and wherein the one or more secondary windings are connected with the integrated current transformer.

8. The power converter according to claim 1, wherein the secondary side of the converter transformer comprises a first secondary winding and a second secondary winding, wherein the first secondary winding is serially connected via a secondary tap to the second secondary winding, and wherein the integrated current transformer is arranged to sense the winding current both in the first secondary winding and in the second secondary winding.

9. The power converter according to claim 8, wherein the secondary tap connecting the first secondary winding and the second secondary winding is connected via a diode in conduction direction to the connection tap between the auxiliary supply circuit, particularly to the connection tap between the diode and the capacitor.

10. A method for power conversion, comprising:
a) converting electrical power with a converter transformer having a primary winding and a secondary winding,
b) measuring a winding current of the converter transformer with an integrated current transformer,
c) rectifying an electrical current provided by the secondary winding of the converter transformer with a synchronous rectifier, whereby the synchronous rectifier is closed and/or opened as a function of the winding current at a later and/or at an earlier time, whereby the time difference between the later and the earlier time is linearly dependent on the winding current difference, and
d) providing auxiliary supply power which is derived from the integrated current transformer, in particular in overload situations.

11. The method for power conversion according to claim 10, wherein the synchronous rectifier is closed for a first winding current at a later time than for a second winding current, and wherein the first winding current is smaller than the second winding current.

12. The method for power conversion according to claim 10, wherein the synchronous rectifier is opened for a first winding current at an earlier time than for a second winding current, and wherein the first winding current is smaller than the second winding current.

13. The method for power conversion according to claim 10, wherein producing an auxiliary supply power is provided by arranging an auxiliary supply circuit to derive auxiliary supply power from the integrated current transformer, wherein the auxiliary supply circuit comprises a diode serially connected via a connection tap to a capacitor, wherein the diode is connected to the rectifier circuit and the capacitor is connected to mass, and wherein the connection tap between the diode and the capacitor provides for the auxiliary supply.

* * * * *